(12) United States Patent
Ghannam et al.

(10) Patent No.: US 8,746,084 B2
(45) Date of Patent: Jun. 10, 2014

(54) VEHICLE IMPACT SENSING SYSTEM

(75) Inventors: Mahmoud Yousef Ghannam, Canton, MI (US); Todd N. Clark, Dearborn, MI (US); Eric Layton Stratten, Plymouth, MI (US); Swadad A. Carremm, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 13/406,399

(22) Filed: Feb. 27, 2012

(65) Prior Publication Data

US 2013/0220031 A1    Aug. 29, 2013

(51) Int. Cl.
G01L 1/00    (2006.01)
G01L 5/00    (2006.01)
G01L 1/04    (2006.01)

(52) U.S. Cl.
USPC ................................ 73/862.381; 73/862.621

(58) Field of Classification Search
USPC ...................................... 73/862.381, 862.621
See application file for complete search history.

(56) References Cited

U.S. PATENT DOCUMENTS

| | | | |
|---|---|---|---|
| 3,774,938 A * | 11/1973 | Orlando | 280/735 |
| 3,862,669 A * | 1/1975 | Lindbert et al. | 280/734 |
| 6,561,301 B1 | 5/2003 | Hattori et al. | |
| 7,623,967 B2 | 11/2009 | Ide | |
| 2006/0229790 A1 * | 10/2006 | Le et al. | 701/70 |
| 2008/0238641 A1 | 10/2008 | Mader | |
| 2009/0254238 A1 | 10/2009 | Metzler | |
| 2009/0306857 A1 * | 12/2009 | Katz et al. | 701/45 |
| 2010/0228424 A1 * | 9/2010 | Clark et al. | 701/29 |
| 2011/0202241 A1 * | 8/2011 | Le et al. | 701/46 |
| 2012/0104777 A1 * | 5/2012 | Ghannam et al. | 293/133 |

OTHER PUBLICATIONS

Signal Conditioner, printed Feb. 23, 2012, http://www.electronics-manufacturers.com/info/data-acquisition/signal-conditioner.html, 2 pages.
Huang, et al., Optimization of Design Parameters for a contact Sensor in Bumper-Pedestrian Impact by using Fe Models, 6th European LS-DYNA Users' Conference, 2007, pp. 1.91-1.110.
Ghanam et al., Pressure Based Sensing Approach for Front Impacts, SAE International, Apr. 12, 2011, 15 pages.

* cited by examiner

*Primary Examiner* — Lisa Caputo
*Assistant Examiner* — Jamel Williams
(74) *Attorney, Agent, or Firm* — Frank A. MacKenzie; Price Heneveld LLP (57) ABSTRACT

An impact sensor system for a vehicle that includes a frame member having a cavity and a chamber arranged within the cavity. The chamber includes two ends with different cross-sectional areas. The impact sensor system further includes a sensor coupled to the chamber that generates a signal indicative of a pressure change within the chamber caused by an impact to the frame member.

20 Claims, 8 Drawing Sheets

FIG. 10B

VEHICLE IMPACT SENSING SYSTEM

FIELD OF THE INVENTION

The present invention generally relates to impact sensing arrangements for vehicles that improve sensor signal amplification and/or response times. More specifically, the present invention relates in general to pressure-based sensing that enables low cost engineering without negatively impacting other vehicle systems and components.

BACKGROUND OF THE INVENTION

Vehicle manufacturers have continually worked to improve impact sensing arrangements and technologies over the past few decades. In general, impact sensing systems continually monitor signals received from sensors located at various points in the vehicle. Using this data, a centralized controller (or controllers in the sensors themselves) evaluates whether the vehicle has been subjected to an impact, whether the impact is indicative of a sufficient impact condition and to what extent, if any, safety systems arranged in the vehicle should be deployed to protect vehicle occupants in response to the impact condition.

The quality of the signals outputted from the various sensors arranged throughout the vehicle affects the reliability and effectiveness of vehicular impact sensing systems. A higher quality signal improves the ability of the controller to differentiate between non-crash impacts to the vehicle (e.g., the impact from a shopping cart hitting a vehicle in a parking lot), inherent sensor noise and crash impacts capable of causing injuries to the vehicle occupants. Hence, the higher the amplitude of the sensor signal (relative to the signal noise), the easier it will be for the controller to effectively evaluate impact conditions.

Another factor that affects the performance of vehicular impact sensing systems is the ability of the sensors to quickly detect impacts and relay that information to the controller. In general, a faster sensor response time gives the controller more time to evaluate the impact signal and more accurately determine whether a safety device should be deployed to prevent occupant harm for a given impact condition.

In addition, conventional impact sensing systems that rely on pressure sensors arrayed within vehicle members and other pre-existing cavities throughout the vehicle have difficulty in measuring pressure associated with crash-related impacts. For example, through-hole features may exist in the front bumper, rear bumper, and/or side doors of vehicles. Although these through-holes may reduce weight in the vehicle and/or provide a wiring conduit for various vehicle components, they also can significantly reduce the ability of pressure sensors to adequately measure pressure associated with a crash-related impact. Furthermore, the pre-existing cavities in some vehicle doors are too large to effectively allow detection of pressure changes indicative of an impact condition.

SUMMARY OF THE INVENTION

One aspect of the present invention is to provide an impact sensor system for a vehicle. The impact sensor system includes a vehicle frame member that defines a cavity, an exterior surface of the vehicle coupled to the vehicle frame member, and a sensor chamber arranged within the cavity. The sensor chamber includes a first end having a first cross-sectional area and a second end having a second cross-sectional area of a different size than the first cross-sectional area, wherein the first end is closer to the exterior surface than the second end. The impact sensor system also includes a sensor coupled to the sensor chamber, wherein the sensor is configured to generate a signal indicative of a pressure change within the sensor chamber caused by an impact to the exterior surface of the vehicle. The impact sensor system additionally includes a controller adapted to receive the signal and determine an occurrence of impact to the exterior surface of the vehicle based at least in part on an evaluation of the signal.

Another aspect of the present invention is to provide an impact sensor system for a vehicle that includes a vehicle frame member that defines a cavity, an exterior surface of the vehicle coupled to the vehicle frame member, and a sensor chamber arranged within the cavity. The sensor chamber includes a first section defined by a first end and a second end, wherein the first end is closer to the exterior surface than the second end. The sensor chamber also includes a second section defined by the second end and a third end, wherein the second end is closer to the exterior surface than the third end. The impact sensor system further includes a sensor coupled to the sensor chamber, wherein the sensor is configured to generate a signal indicative of a pressure change within the sensor chamber caused by an impact to the exterior surface of the vehicle. The impact sensor system additionally includes a controller adapted to receive the signal and determine an occurrence of impact to the exterior surface of the vehicle based at least in part on an evaluation of the signal.

A further aspect of the present invention is to provide an impact sensor system for a vehicle that includes a frame member having a cavity and a chamber arranged within the cavity. The chamber includes two ends with different cross-sectional areas. The impact sensor system further includes a sensor coupled to the chamber that generates a signal indicative of a pressure change within the chamber caused by an impact to the frame member.

The present invention reflects a novel sensing system arrangement that improves sensor signal quality and response times, among other advantages and benefits. When pressure sensors are employed within the present inventive system, for example, the sensors are subjected to higher pressure magnitudes than those associated with conventional impact sensing system arrangements for the same impact magnitude. Accordingly, the signal output from the pressure sensor used in the present invention has a higher magnitude with less noise than the signal from a conventional sensor faced with the same impact. Likewise, when pressure sensors are employed in the present invention, they are subjected to pressure associated with an impact to a vehicle in a relatively shorter time than those sensors used in conventional vehicle safety system arrangements. The result is an improved system response time that likely translates to higher controller accuracy.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
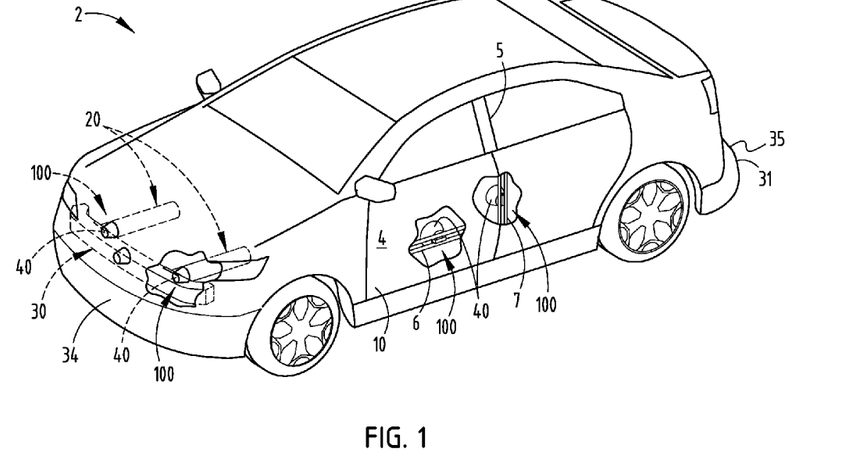
FIG. 1 is a perspective view of a vehicle that includes diverging sensor chamber embodiments of an impact sensing system arranged in the front bumper rails, front bumper, side door, B-pillar, and rear bumper of the vehicle.

For purposes of description herein, the terms "upper," "lower," "right," "left," "rear," "front," "vertical," "horizontal," and derivatives thereof shall relate to the invention as oriented in FIG. 1. However, the invention may assume various alternative orientations, except where expressly specified to the contrary. Also, the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
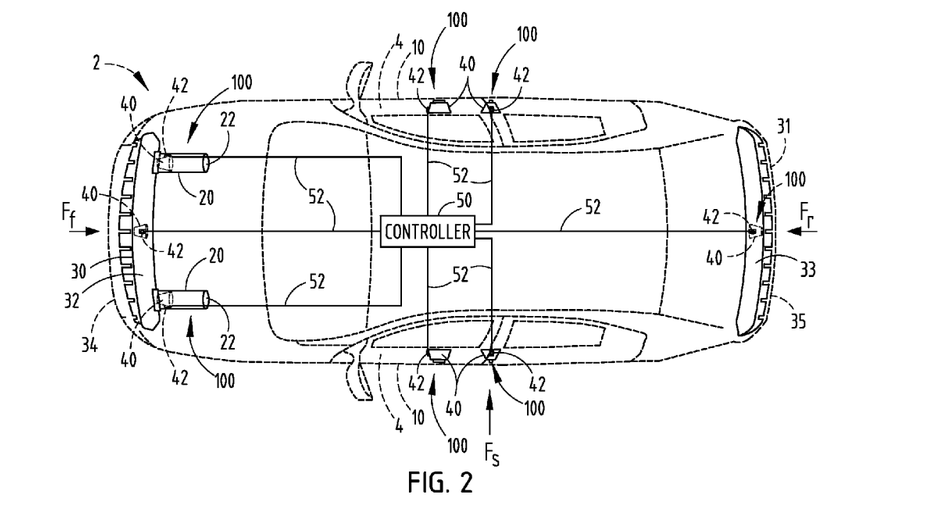
FIG. 2 is a plan view of the vehicle and diverging sensor chamber embodiments according to the vehicle impact sensing system illustrated in FIG. 1.
Figure 3:
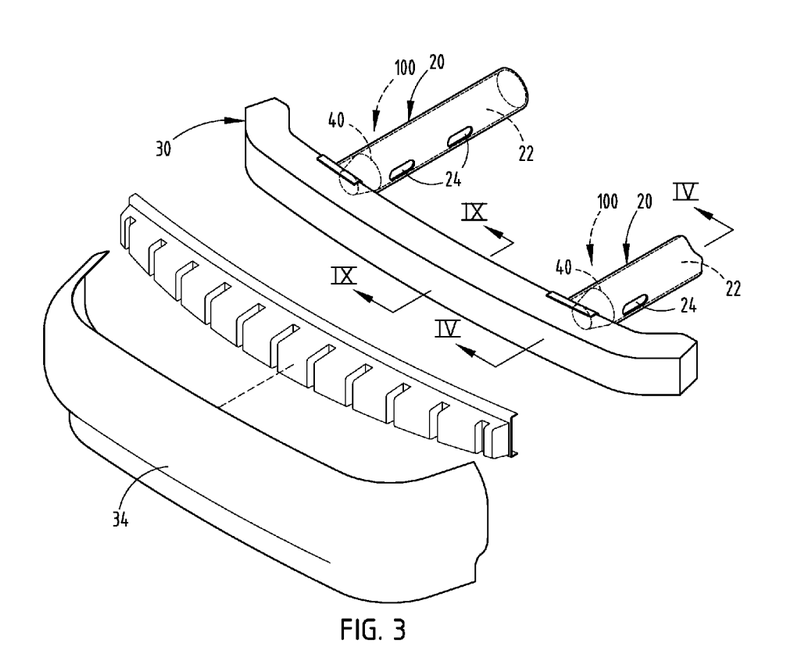
FIG. 3 is a perspective view of a front bumper rail of a vehicle with a diverging sensor chamber embodiment.

Referring to FIGS. 1-10B, the reference numeral 100 generally designates an impact sensor system for a vehicle 2 according to various embodiments. Impact sensor system 100 includes a vehicle frame member having a cavity, e.g., a bumper rail 20 that defines a bumper rail cavity 22 as seen in FIGS. 2 and 3. As is the case with most vehicle members employed by modern vehicles, bumper rail 20 may include one or more through-holes 24 (FIG. 3). Through-hole features, such as the holes 24 in bumper rail 20, may be introduced into vehicle members to reduce weight in the vehicle and/or provide a conduit that may be used for wiring various vehicle components. In conventional vehicle safety systems, holes or conduits in vehicle members, such as through-holes 24, inhibit measurement of pressure in the cavity defined by the vehicle member. This reduces the effectiveness of conventional vehicle safety systems that rely on pressure sensors to measure impact forces.

Figures 4, 4A:
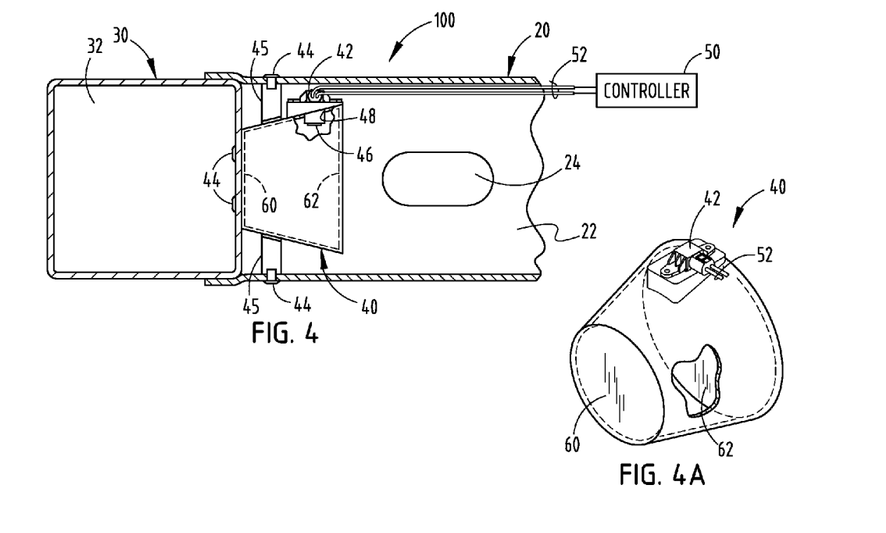
FIG. 4 is a cross-sectional view of the front bumper rail and diverging sensor chamber embodiment illustrated in FIG. 3.
FIG. 4A is a perspective view of the diverging sensor chamber embodiment illustrated in FIG. 3.

The impact sensor system 100 overcomes the problems associated with conventional vehicle safety systems, such as the problems associated with vehicle member through-holes (e.g., through-holes 24) with the use of a sensor chamber 40. Sensor chamber 40 is coupled to the bumper rail 20 at one or more locations within bumper rail cavity 22. As depicted in FIG. 4, sensor chamber 40 may be coupled to the bumper rail 20 at various locations using chamber fasteners 44 and chamber brackets 45. Various types of fasteners 44 may be used according to the various embodiments including, but not limited to, bolts, threads, rivets, screws and the like. Further, various chamber brackets 45 may be employed with the impact sensing system 100 including, but not limited to, L-brackets, angle irons, flanges and the like. Sensor chamber 40 may also be coupled to the vehicle frame member, such as bumper rail 20, at various locations. Indeed, the impact sensing system 100 may further include a sensor chamber 40 coupled to a vehicle member possessing various design features that have already been finalized during the vehicle development and manufacturing process. Accordingly, sensor chamber 40 may be coupled to the vehicle member, such as bumper rail 20, at various locations within the vehicle member based on space, structural support or other considerations. The flexibility associated with the placement of sensor chamber 40 within the vehicle frame member avoids costly re-designs of vehicle components, including vehicle frame members. Further, various vehicle frame members are suitable for use with impact sensor system 100, provided that they possess a cavity that can support and provide sufficient space for sensor chamber 40.

Sensor chamber 40 shown in FIGS. 4 and 4A defines a sensor chamber opening 48, a first end 60 and a second end 62. The first end 60 defines a first cross-sectional area and the second end 62 defines a second cross-sectional area. The first and second cross-sectional areas of respective first and second ends 60 and 62 are not equal to one another in size and may be defined by various shapes, including but not limited to, round, elliptical, rhomboidal, square and triangular shapes. The distance between ends 60 and 62 may also be adjusted. These shapes, cross-sectional areas and section distances may be adjusted to optimize the measured pressure signal in terms of signal amplitude and response time.

The particular embodiment of the impact sensor system 100 illustrated in FIGS. 4 and 4A has a sensor chamber 40 that possesses a diverging, conical shape. Chamber 40 owes its shape to the round, cross-sectional area of first end 60 being smaller than the round cross-sectional area of second end 62. In general, a diverging-shaped sensor chamber 40 serves to amplify the pressure signal measured by pressure sensor assembly 42. Further, when sensor chamber 40 possesses a diverging-type chamber geometry, the volume of the chamber 40 expands in the direction of impact. In effect, this change in volume as sensor chamber 40 crumples from an impact effectively amplifies or increases the magnitude of the signal measured by pressure sensor assembly 42. The higher pressure signal amplitude provided by sensor chamber 40 when arranged in a diverging shape offers a benefit to the vehicle safety system as a whole. In particular, the system is better able to detect real impacts over signal noise when it evaluates pressure signals with higher amplitudes.

Impact sensor system 100 further includes a pressure sensor assembly 42. The pressure sensor assembly 42 is coupled to the sensor chamber 40. Further, pressure sensor assembly 42 comprises a pressure sensor 46 that extends partially through sensor chamber opening 48 into the sensor chamber 40. Various sensors relying on transducers, piezoelectric materials or other means of measuring pressure may be employed in the impact sensor system 100 for use as pressure sensor 46. Pressure sensor 46 is configured within sensor chamber 40 to measure the pressure within the chamber that results from an impact by an object to an exterior surface the vehicle.

As illustrated in FIG. 1, impact sensor system 100 may be employed at various locations within vehicle 2. Preferably, impact sensor system 100 is employed in vehicle members defining cavities (with or without through-holes) that are not otherwise conducive to the measurement of pressure indicative of a crash impact. For example, sensor chamber 40 (here, in a diverging, conical shape) may be fitted in the side door 4 and/or B-pillar 5 of vehicle 2. Side door 4 and B-pillar 5 also include vehicle frame members, such as side door support beam 6 and B-pillar beam 7. Sensor chamber 40 is coupled to these frame members. Further, side door support beam 6 defines a side door support cavity 8 (shown in FIG. 10A) and B-pillar beam 7 defines B-pillar cavity 9 (shown in FIG. 10). Accordingly, chamber 40 is located within side door support cavity 8 and/or B-pillar cavity 9. As shown in FIG. 2, sensor chamber 40 may be arranged to measure a side impact force $F_s$ to a side door exterior surface 10 of vehicle 2 when chamber 40 is configured within side door support beam 6 and/or B-pillar beam 7. A pressure sensor assembly 42 is coupled to sensor chamber 40, and the assembly 42 measures pressure that builds in sensor chamber 40 when it is crushed from a side impact force $F_s$.

FIG. 1 also demonstrates that impact sensor system 100 may be employed within a front bumper 30 according to one embodiment. Front bumper 30 defines a front bumper cavity 32 and a front bumper exterior surface 34 (FIGS. 1 and 2). Sensor chamber 40 is coupled to front bumper 30 using fasteners and brackets (not shown), and configured within front bumper cavity 32. Further, pressure sensor assembly 42 is coupled to sensor chamber 40, and the assembly 42 measures pressure that builds in sensor chamber 40 when it is crushed from a front impact force $F_f$ to front bumper surface 34.

In addition, impact sensor system 100 can be employed within a rear bumper 31. Here, rear bumper 31 defines a rear bumper cavity 33 and a rear bumper exterior surface 35 (FIGS. 1 and 2). The impact system 100 in a rear bumper configuration operates and functions similarly to impact system 100 in a front bumper configuration, except that the rear bumper-configured system 100 measures pressure that builds in sensor chamber 40 when chamber 40 is crushed from a rear impact force $F_r$ to rear bumper exterior surface 35.

FIGS. 1 and 2 also demonstrate the use of impact sensor systems 100 arranged in various vehicle frame members within vehicle 2 that, in combination, form a comprehensive vehicle safety system arrangement. Each impact sensor system 100 is connected to a controller 50. The controller 50 may include a microprocessor, ASIC or other control circuitry as should be appreciated by those in the art. A signal is generated by the pressure sensor assembly 42 (associated with each impact sensor system 100) based on the pressure measured within sensor chamber 40 by pressure sensor 46. This signal is received by controller 50 via sensor leads 52 that emanate from each pressure sensor assembly 42 (see FIGS. 2 and 4).

FIG. 2 further shows that sensor leads 52 may be arranged in various locations throughout vehicle 2 in order to transmit the signal from each pressure sensor 46 to controller 50.

Controller 50 is configured to determine an occurrence of impact to an exterior surface or surfaces of the vehicle based at least in part on an evaluation of the signal transmitted by each pressure sensor assembly 42. Controller 50 may also be configured to initiate deployment of safety apparatus (not shown) based on an evaluation of the signal from each pressure sensor assembly 42. Controller 50 may also ascertain the orientation, magnitude and timing of impact forces (i.e., crash vectors) directed against exterior surfaces of vehicle 2. Controller 50 may use such crash vector information to deploy safety apparatus, e.g., airbags, head restraints, side curtains and the like (not shown), within the vehicle at particular times in order to maximize safety of all vehicle occupants.

Figures 5, 5A:
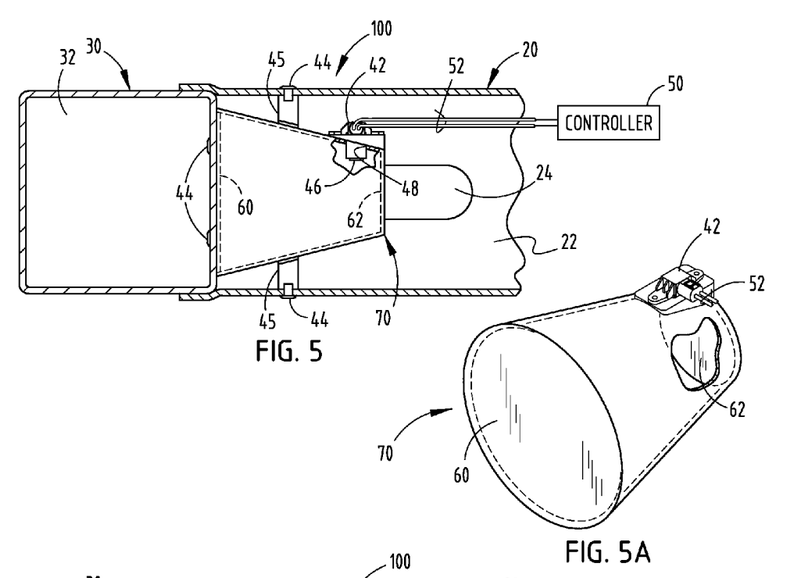
FIG. 5 is a cross-sectional view of the front bumper rail illustrated in FIG. 3 and a converging sensor chamber embodiment.
FIG. 5A is a perspective view of the converging sensor chamber embodiment illustrated in FIG. 5.

FIGS. 5 and 5A demonstrate that sensor chamber 40 may be arranged in a converging, conical shape according to another embodiment. Similar to the sensor chamber depicted in FIG. 4, the converging, conical sensor chamber 40 defines a sensor chamber opening 48, a first end 60 and a second end 62, each end further defining a cross-sectional area. The cross-sectional areas of ends 60 and 62 are not equal to one another and may be defined by various shapes including, but not limited to, round, elliptical, rhomboidal, square and triangular shapes.

Figure 7:
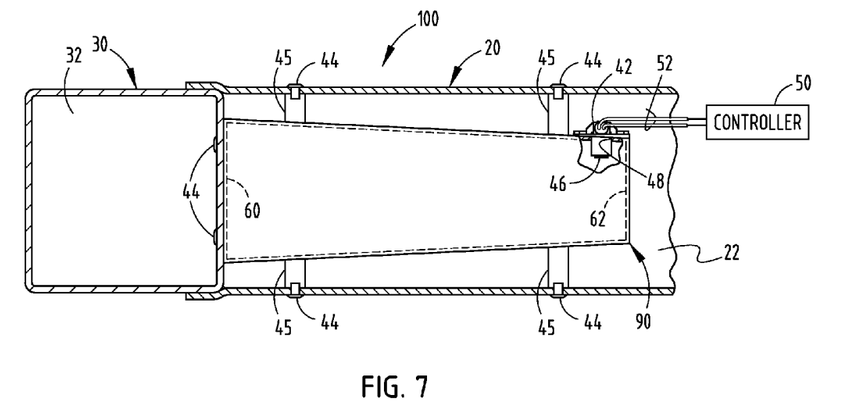
FIG. 7 is a cross-sectional view of the front bumper rail illustrated in FIG. 3 and a non-rounded cross section sensor chamber embodiment.
Figure 7A:
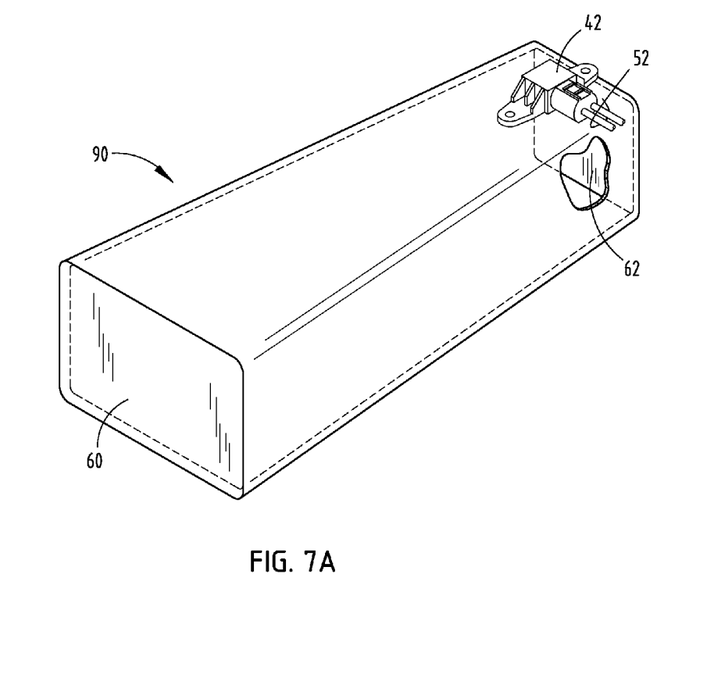
FIG. 7A is a perspective view of the non-rounded cross section sensor chamber embodiment illustrated in FIG. 7.

In the embodiment illustrated by FIGS. 5 and 5A, sensor chamber 40 possesses a converging, conical shape because the round cross-sectional area of first end 60 is larger than the round cross-sectional area of second end 62. Similarly, FIGS. 7 and 7A depict a converging sensor chamber 40 with non-rounded, cross-sections having square-shaped first and second ends 60 and 62 according to another embodiment. In general, a converging-shaped sensor chamber 40 serves to increase the air flow velocity within chamber 40 associated with an impact oriented toward the end of the chamber with a smaller cross-sectional area. In effect, the pressure signal measured by pressure sensor assembly 42 from a converging, shaped chamber 40 is obtained with a faster response time than a comparable signal derived from a diverging chamber arrangement or an arrangement in which the first end 60 and second end 62 each roughly have the same cross-sectional area. Ultimately, crash-worthy impact determinations can be made earlier during an impact, leading to earlier crash safety system deployment determinations and improved system efficacy.

Figures 6, 6A:
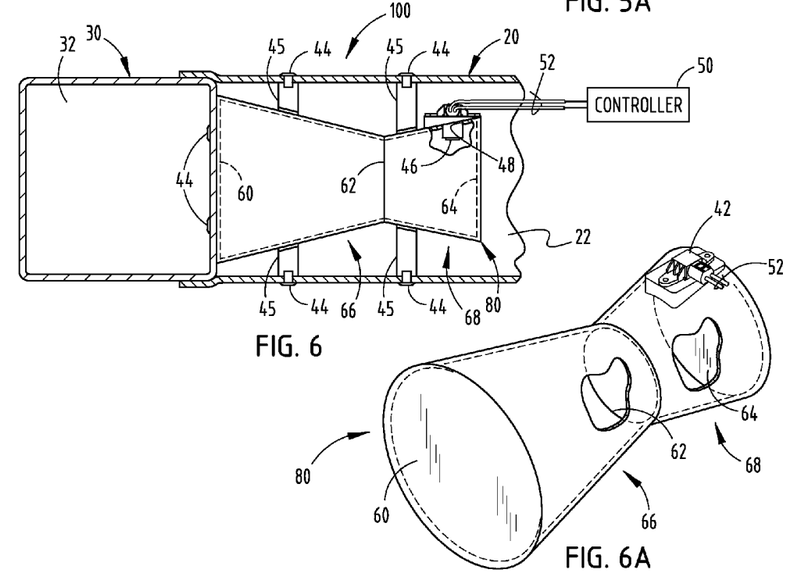
FIG. 6 is a cross-sectional view of the front bumper rail illustrated in FIG. 3 and a dual-section sensor chamber embodiment.
FIG. 6A is a perspective view of the dual-section sensor chamber embodiment illustrated in FIG. 6.

In addition, FIGS. 6 and 6A show that sensor chamber 40 may be arranged in a dual-section shape according to a further embodiment. Here, sensor chamber 40 includes a sensor chamber opening 48 and a first section 66 defined by a first end 60 and a second end 62, wherein the first end 60 is closer to an exterior surface of vehicle 2 (not shown) than second end 62. Sensor chamber 40 also includes a second section 68 defined by the second end 62 and a third end 64, wherein the second end 62 is closer to an exterior surface of vehicle 2 than the third end 64. Pressure sensor assembly 42 is coupled to sensor chamber 40 and further includes a pressure sensor 46. Pressure sensor 46 extends partially into sensor chamber 40 and measures the pressure in the chamber associated with an impact to an exterior surface of the vehicle (not shown). In the configuration shown in FIGS. 6 and 6A, the pressure sensor assembly 42 is coupled to the second section 68 of sensor chamber 40; however, the pressure sensor assembly 42 may by coupled to the chamber 40 at other locations, including first section 66.

As further depicted in FIGS. 6 and 6A, first, second and third ends 60, 62 and 64 of dual-section sensor chamber 40 may be configured such that each possess a cross-sectional area that differs in size from the cross-sectional area of the other ends. Also note that second end 62 in this configuration is used to define a cross-sectional area, but the end 62 has no structure itself. Accordingly, the first and second sections 66 and 68 define a contiguous chamber.

Further, each end 60, 62 and 64 may be defined by various shapes, including, but not limited to round, elliptical, rhomboidal, square and triangular shapes. As shown here, dual-section sensor chamber 40 may also possess a converging/diverging, conical shape that results from a round, cross-sectional area of first end 60 being larger than the round, cross-sectional area of second end 62, and the cross-sectional area of second end 62 is smaller than the cross-sectional area of third end 64. A converging/diverging sensor chamber 40 can be optimized to both improve signal amplitude and response time for the signal measured by pressure sensor assembly 42. Various options are possible, including a configuration in which first section 66 represents a diverging-shaped portion of chamber 40, and second section 68 represents a converging-shaped portion of chamber 40 (not shown).

Figure 8:
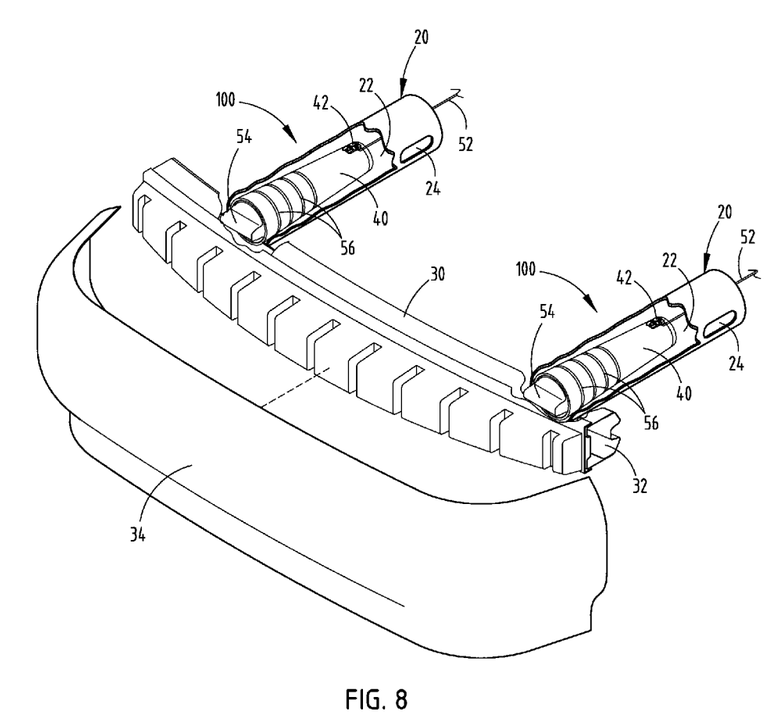
FIG. 8 is a perspective view of a front bumper rail of a vehicle with a cut-away view that depicts a converging sensor chamber embodiment.
Figure 8A:
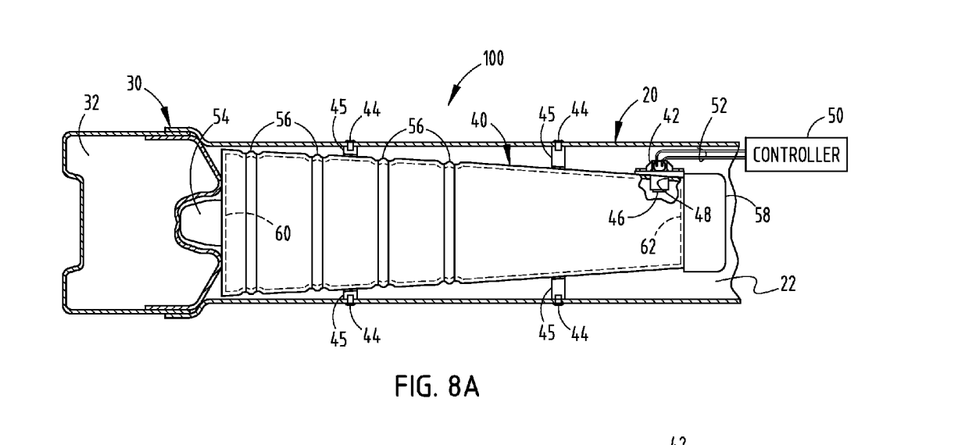
FIG. 8A is a cross-sectional view of the front bumper rail and converging sensor chamber embodiment illustrated in FIG. 8.
Figure 8B:
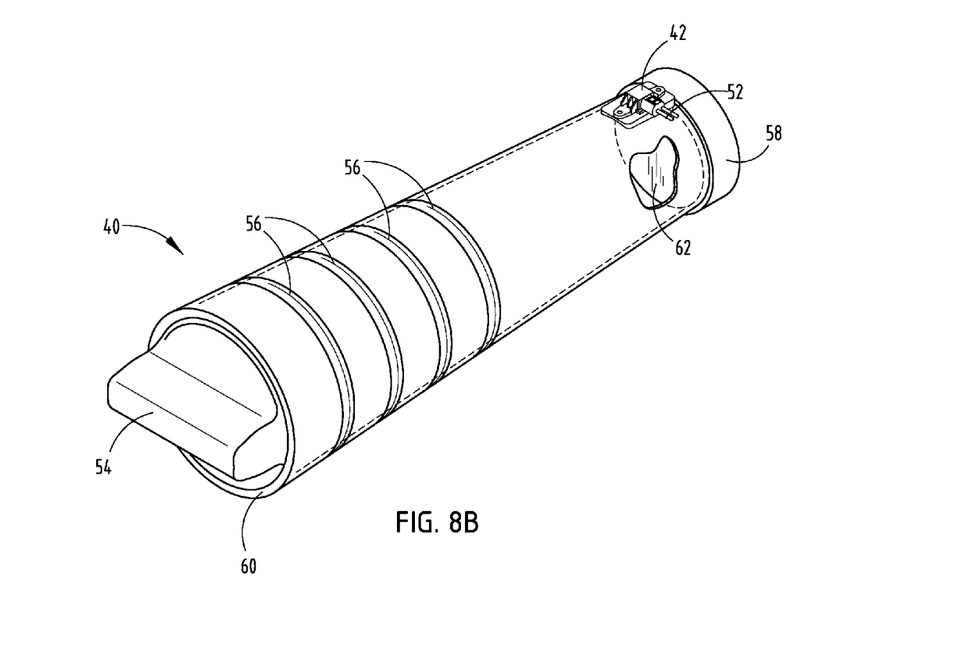
FIG. 8B is a perspective view of the converging sensor chamber embodiment illustrated in FIG. 8.

Another embodiment of the impact sensor system 100 is depicted in FIGS. 8, 8A and 8B. These figures depict an arrangement of two impact sensor systems 100 in the front bumper rails 20 of a vehicle 2 (not shown). In this arrangement, sensor chamber 40 is configured in a converging, conical chamber shape possessing first and second ends 60 and 62 (ends not shown) with round cross-sectional shapes. Further, sensor chamber 40 is also configured with chamber notched rings 56, oriented in proximity to chamber bumper cap 54, itself oriented in proximity to first end 60. The notched rings are designed to facilitate compression and crushing of sensor chamber 40 upon impact to a vehicle exterior surface, e.g., bumper surface 34 (FIG. 8). The rings 56 ensure that the volume of chamber 40 is reduced upon impact such that the pressure measured by pressure sensor assembly 42 is of sufficient magnitude and response time for proper vehicle safety system performance.

In FIGS. 8, 8A and 8B, chamber bumper cap 54 is configured alongside, adjacent to or coupled with first end 60 of sensor chamber 40. Bumper cap 54 is designed to mate with a pre-existing feature in bumper 30 as depicted in FIG. 8A. As such, chamber bumper cap 54 may be configured in any shape such that it can be coupled to a pre-existing feature in bumper 30. By using chamber bumper cap 54 as the means to attach sensor chamber 40 (within bumper rail 20) to bumper 30, the shape of sensor chamber 40 can be designed solely for the purpose of optimizing the pressure signal response (i.e., magnitude and response time) obtained by pressure sensor assembly 42 upon an impact to the front of the vehicle, for example. The shape of sensor chamber 40 may be optimized by altering the cross-sectional area and/or shape of first end 60 and second end 62. Further, the pressure response of sensor chamber 40 can be adjusted by altering the distance between first end 60 and second end 62.

As also depicted in FIGS. 8, 8A and 8B, sensor chamber 40 further includes a chamber reaction cap 58, oriented in proximity to second end 62. Chamber reaction cap 58 provides a solid surface within chamber 40 that allows pressure to build within the chamber upon an impact to an exterior surface of the vehicle, e.g., bumper surface 34 (FIG. 8). The portion of chamber 40 in proximity to reaction cap 58 does not crumple as much as the portion of the chamber in proximity to chamber notched rings 56. Hence, pressure builds in chamber 40 upon an impact as first end 60 (and chamber bumper cap 54) compresses (displacing inward) relative to reaction cap 58.

Figure 9:
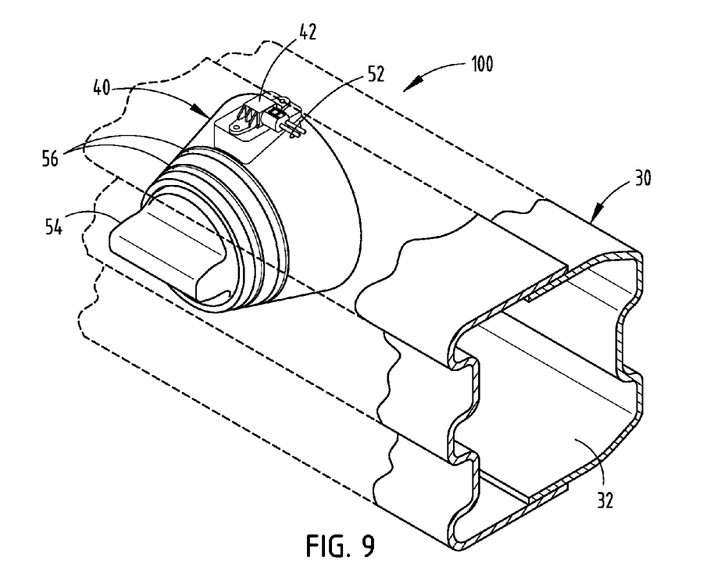
FIG. 9 is a perspective view of a front bumper of a vehicle with a cut-away view that depicts a diverging sensor chamber embodiment.
Figure 9A:
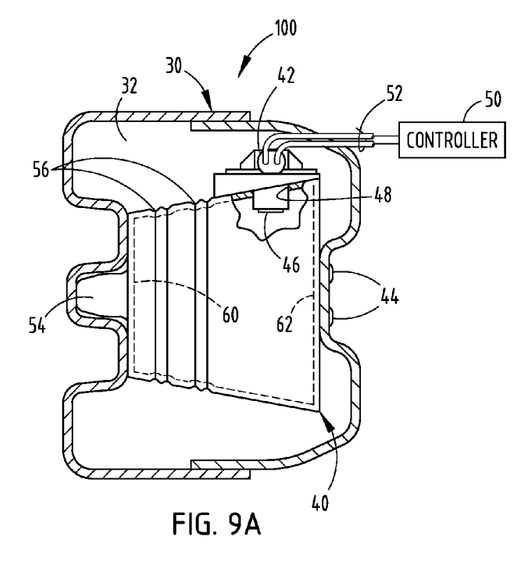
FIG. 9A is a cross-sectional view of the front bumper and diverging sensor chamber embodiment illustrated in FIG. 9.
Figure 9B:
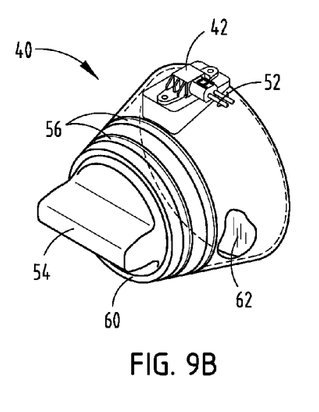
FIG. 9B is a perspective view of the diverging sensor chamber embodiment illustrated in FIG. 9.

FIGS. 9, 9A and 9B depict another embodiment of the impact sensor system 100, namely, a front bumper 30 of a vehicle 2 (not shown) with an impact sensor system 100 that contains a diverging sensor chamber 40. Here, sensor chamber 40 is located within front bumper cavity 32. In particular, sensor chamber 40 is configured in a diverging, conical chamber shape possessing first and second ends 60 and 62 (ends shown in FIG. 9B) with round, cross-sectional shapes. Further, sensor chamber 40 is configured with chamber notched rings 56, oriented in proximity to chamber bumper cap 54, itself oriented in proximity to first end 60. As mentioned earlier, rings 56 ensure that the volume of chamber 40 is reduced upon impact. In this way, the pressure measured by pressure sensor assembly 42 is of a sufficient magnitude and response time to ensure adequate performance by impact sensor system 100 and any larger system with additional impact sensor systems 100.

Impact sensor system 100 of this embodiment (and the embodiment depicted in FIG. 8A) may be integrated into a larger vehicle safety system via controller 50 and wiring 52. In addition, impact sensor system 100 includes a chamber bumper cap 54 designed to mate with a pre-existing feature within bumper cavity 32. As such, bumper cap 54 may be configured in any shape so that it may be coupled to a pre-existing feature in bumper cavity 32. By relying on chamber bumper cap 54 as the means to attach sensor chamber 40 to bumper 30 (within bumper cavity 32), the shape of sensor chamber 40 can be adjusted solely for the purpose of optimizing the pressure signal response obtained by pressure sensor assembly 42 upon an impact to the front of the vehicle in proximity to the bumper, for example. As discussed earlier, sensor chamber 40 can be optimized by varying the cross-sectional area and/or shape of the chamber ends 60 and 62, among other design options.

Figure 10:
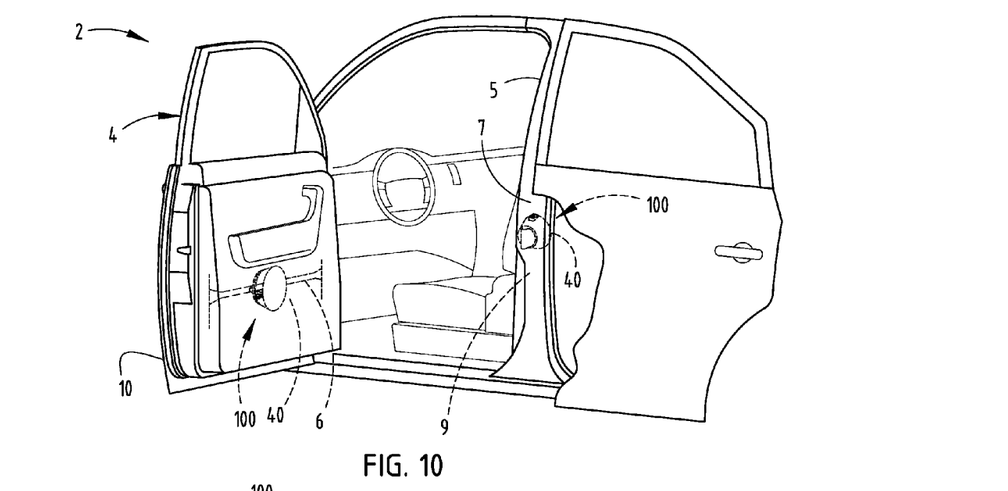
FIG. 10 is a perspective view of a side door and B-pillar, each housing a diverging sensor chamber embodiment.
Figure 10A:
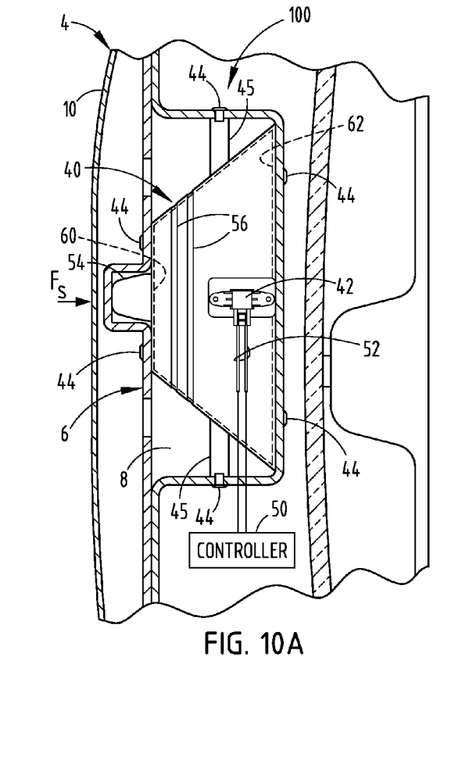
FIG. 10A is an enlarged, cross-sectional view of the diverging sensor chamber embodiment in the side door illustrated in FIG. 10.
Figure 10B:
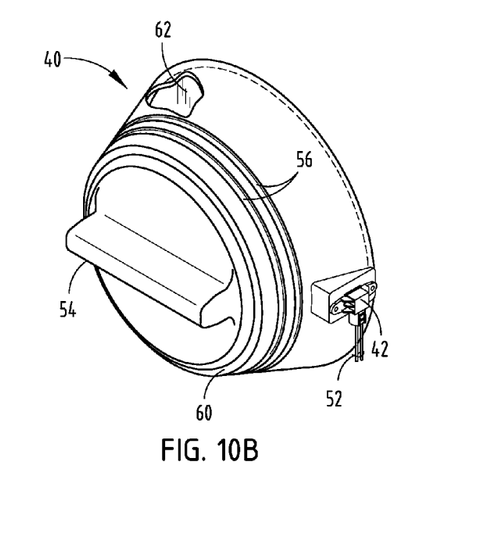
FIG. 10B is a perspective view of the diverging sensor chamber embodiment illustrated in FIG. 10A.

FIGS. 10, 10A and 10B depict another embodiment, illustrating an impact sensor system 100 arrangement in a side door 4 of a vehicle 2. FIG. 10 also shows an impact sensor system 100 in a B-pillar of the vehicle 2. Here, impact sensor system 100 includes a diverging sensor chamber 40, arranged to sense pressure in the chamber that originates from a side impact force $F_s$ directed against the side door exterior surface 10. Similar to the embodiments depicted in FIGS. 8-9, the diverging sensor chamber 40 in side door 4 and/or B-pillar 5 includes a chamber bumper cap 54 and chamber notched rings 56. The bumper cap and notched ring features serve the same purpose that they do in the previous embodiments. Further, sensor chamber 40 is configured within side door support cavity 8 (FIG. 10A) and/or B-pillar cavity 9 (FIG. 10). Chamber 40 is further coupled to side door support beam 6 and/or B-pillar beam 7 via fasteners 44 and brackets 45. The embodiment depicted in FIGS. 10, 10A and 10B may also be integrated into a larger vehicle safety system via controller 50 and wiring 52, as discussed in connection with the embodiments depicted in FIGS. 8 and 9.

Variations and modifications can be made to the aforementioned structure without departing from the concepts of the present invention. Further, such concepts are intended to be covered by the following claims unless these claims by their language expressly state otherwise.

We claim:

1. An impact sensor system for a vehicle, the system comprising:
    a vehicle frame member that defines a cavity;
    an exterior surface of the vehicle coupled to the vehicle frame member;
    a sensor chamber arranged within the cavity, the sensor chamber comprising a first end having a first cross-sectional area and a second end having a second cross-sectional area of a different size than the first cross-sectional area, wherein the first end is closer to the exterior surface than the second end;

a sensor coupled to the sensor chamber, wherein the sensor is configured to generate a signal indicative of a pressure change within the sensor chamber caused by an impact to the exterior surface of the vehicle; and a controller adapted to receive the signal and determine an occurrence of impact to the exterior surface of the vehicle based at least in part on an evaluation of the signal.

2. The impact sensor system of claim 1, wherein the first cross-sectional area of the first end is larger than the second cross-sectional area of the second end.

3. The impact sensor system of claim 1, wherein the first cross-sectional area of the first end is smaller than the second cross-sectional area of the second end.

4. The impact sensor system of claim 1, wherein the vehicle frame member is a bumper having an outer wall in proximity to the exterior surface of the vehicle, and the sensor chamber is coupled to the outer wall.

5. The impact sensor system of claim 1, wherein the vehicle frame member is a bumper rail having an outer wall in proximity to the exterior surface of the vehicle, and the sensor chamber is coupled to the outer wall.

6. The impact sensor system of claim 1, wherein the vehicle frame member is a door or B-pillar having an outer wall in proximity to the exterior surface of the vehicle, and the sensor chamber is coupled to the outer wall.

7. The impact sensor system of claim 5, wherein the sensor chamber is further configured with a bumper cap, the bumper cap coupled to the outer wall of the bumper rail and the first end of the sensor chamber.

8. An impact sensor system for a vehicle, the system comprising:

a vehicle frame member that defines a cavity;

an exterior surface of the vehicle coupled to the vehicle frame member;

a sensor chamber arranged within the cavity, the sensor chamber comprising a first section defined by a first end and a second end, wherein the first end is closer to the exterior surface than the second end, and a second section defined by the second end and a third end, wherein the second end is closer to the exterior surface than the third end;

a sensor coupled to the sensor chamber, wherein the sensor is configured to generate a signal indicative of a pressure change within the sensor chamber caused by an impact to the exterior surface of the vehicle; and a controller adapted to receive the signal and determine an occurrence of impact to the exterior surface of the vehicle based at least in part on an evaluation of the signal.

9. The impact sensor system of claim 8, wherein the first, second and third ends are defined by cross-sectional areas that each differ in size.

10. The impact sensor system of claim 8, wherein the first, second and third ends are defined by cross-sectional areas and the cross-sectional area of the first, second or third end is not equal to the cross-sectional areas of the remaining ends.

11. The impact sensor system of claim 8, wherein the vehicle frame member is a bumper having an outer wall in proximity to the exterior surface of the vehicle, and the sensor chamber is coupled to the outer wall.

12. The impact sensor system of claim 8, wherein the vehicle frame member is a bumper rail having an outer wall in proximity to the exterior surface of the vehicle, and the sensor chamber is coupled to the outer wall.

13. The impact sensor system of claim 8, wherein the vehicle frame member is a door or B-pillar having an outer wall in proximity to the exterior surface of the vehicle, and the sensor chamber is coupled to the outer wall.

14. The impact sensor system of claim 12, wherein the sensor chamber is further configured with a bumper cap, the bumper cap coupled to the outer wall of the bumper rail and the first end of the sensor chamber.

15. An impact sensor system for a vehicle, the system comprising:

a frame member having a cavity;

a chamber arranged within the cavity, the chamber having two ends with different cross-sectional areas; and a sensor coupled to the chamber that generates a signal indicative of a pressure change within the chamber caused by an impact to the frame member.

16. The impact sensor system of claim 15, wherein the cross-sectional area of the first end is larger than the cross-sectional area of the second end.

17. The impact sensor system of claim 15, wherein the cross-sectional area of the first end is smaller than the cross-sectional area of the second end.

18. The impact sensor system of claim 15, wherein the frame member is a bumper having an outer wall in proximity to an exterior surface of the vehicle, and the chamber is coupled to the outer wall.

19. The impact sensor system of claim 15, wherein the frame member is a bumper rail having an outer wall in proximity to an exterior surface of the vehicle, and the chamber is coupled to the outer wall.

20. The impact sensor system of claim 15, wherein the frame member is a door or B-pillar having an outer wall in proximity to an exterior surface of the vehicle, and the chamber is coupled to the outer wall.

* * * * *